US012289001B2

(12) United States Patent
Lee et al.

(10) Patent No.: US 12,289,001 B2
(45) Date of Patent: Apr. 29, 2025

(54) ELECTRONIC DEVICE CAPABLE OF PROVIDING POWER TO EXTERNAL DEVICE

(71) Applicant: Samsung Electronics Co., Ltd., Gyeonggi-do (KR)

(72) Inventors: Kyunghwan Lee, Gyeonggi-do (KR); Yeongil Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 18/218,168

(22) Filed: Jul. 5, 2023

(65) Prior Publication Data

US 2023/0344250 A1    Oct. 26, 2023

Related U.S. Application Data

(63) Continuation of application No. PCT/KR2022/001025, filed on Jan. 20, 2022.

(30) Foreign Application Priority Data

Jan. 20, 2021  (KR) .................. 10-2021-0008220

(51) Int. Cl.
*H02J 7/00*        (2006.01)
*G06F 1/26*        (2006.01)
*H02M 3/158*       (2006.01)

(52) U.S. Cl.
CPC .......... *H02J 7/00308* (2020.01); *G06F 1/266* (2013.01); *H02M 3/158* (2013.01)

(58) Field of Classification Search
CPC .... H02J 7/00308; H02J 7/0044; H02J 7/0047; H02J 7/0063; H02J 7/0068; H02J 7/0032; G06F 1/26

See application file for complete search history.

(56) References Cited

U.S. PATENT DOCUMENTS 10,664,029 B2    5/2020  Koga
10,680,432 B2 *  6/2020  Hijazi .................... H02H 3/202
(Continued)

FOREIGN PATENT DOCUMENTS

CN    203813481 U    9/2014
CN    102738869 B    2/2015
(Continued)

OTHER PUBLICATIONS

Extended European Search Report dated May 14, 2024.
Korean Office Action dated Feb. 13, 2025.

*Primary Examiner* — Raymond N Phan
(74) *Attorney, Agent, or Firm* — Cha & Reiter, LLC

(57) ABSTRACT

According to certain embodiments, an electronic device comprises: a battery; an interface module; a detection module electrically connected with the interface module, the detection module configured to detect than an external electronic device for receiving power is connected to the interface module; a protection module electrically connected with the interface module and comprising a first switching element; and a charging module electrically connected with the protection module, the detection module, and the battery, and comprising a voltage conversion circuit and a second switching element, the charging module configured to provide a first power to the protection module when the detection module detects connection of the external electronic device, wherein the first switching element is configured to turn on after receiving the first power, wherein the charging module is configured to raise a power from the battery to a designated value through the voltage conversion circuit, thereby resulting in a second power, and, when a designated first time is elapsed after the power from the battery is raised to the designated value, turn on the second (Continued)

switching element, thereby providing the second power to the protection module.

20 Claims, 12 Drawing Sheets

(56) References Cited

U.S. PATENT DOCUMENTS

| | | | |
|---|---|---|---|
| 10,840,730 B2 | 11/2020 | Lim et al. | |
| 11,462,998 B2 | 10/2022 | Kwak et al. | |
| 11,775,040 B2 | 10/2023 | Lim et al. | |
| 2012/0002995 A1 | 1/2012 | Choi et al. | |
| 2016/0018868 A1* | 1/2016 | Shimada | G06F 1/324 713/322 |
| 2016/0254688 A1* | 9/2016 | Jung | H02J 7/007 320/164 |
| 2016/0308452 A1 | 10/2016 | Motoki | |
| 2017/0346240 A1 | 11/2017 | Oporta et al. | |
| 2018/0335818 A1 | 11/2018 | Mattos et al. | |
| 2019/0131810 A1 | 5/2019 | Lim et al. | |
| 2020/0004308 A1 | 1/2020 | Moritomo et al. | |
| 2020/0067304 A1 | 2/2020 | Kim | |
| 2020/0212704 A1 | 7/2020 | Eftimie | |
| 2020/0373834 A1 | 11/2020 | Kwak et al. | |
| 2021/0036525 A1* | 2/2021 | Kim | H02J 7/00036 |
| 2021/0226457 A1* | 7/2021 | Liang | H04M 1/72409 |
| 2021/0399561 A1 | 12/2021 | Im et al. | |

FOREIGN PATENT DOCUMENTS

| | | |
|---|---|---|
| CN | 103607009 B | 3/2016 |
| CN | 103944224 B | 6/2016 |
| JP | 2018-29408 A | 2/2018 |
| JP | 6554308 B2 | 7/2019 |
| KR | 10-2012-0003661 A | 1/2012 |
| KR | 10-1757460 B1 | 7/2017 |
| KR | 10-2019-0049256 A | 5/2019 |
| KR | 10-2020-0017779 A | 2/2020 |
| KR | 10-2020-0050260 A | 5/2020 |
| KR | 10-2020-0134058 A | 12/2020 |
| WO | 2019/209785 A1 | 10/2019 |

\* cited by examiner

ELECTRONIC DEVICE CAPABLE OF PROVIDING POWER TO EXTERNAL DEVICE

CLAIM OF PRIORITY

This application is a continuation of International Application No. PCT/KR2022/001025, published as WO 2022/158870, filed Jan. 20, 2022, that claims priority to Korean Patent Application No. KR-10-2021-0008220, filed on Jan. 20, 2021 in the Korean Intellectual Property Office, the disclosures of which are herein incorporated by reference.

BACKGROUND

1. Technical Field

Certain embodiments of the disclosure relate to an electronic device capable of providing (or supplying) power to an external device.

2. Description of Related Art

An electronic device may provide power (for example, an on-the-go (OTG) mode) to an external device. The external device can be connected thereto through a universal serial bus (USB) interface. For example, when connection of an external device to receive power from the electronic device is detected, the electronic device may raise a voltage of a battery through a power supply module (for example, a charging module), and may supply power to the external device.

The electronic device may include a protection module (for example, an overvoltage protection integrated circuit (OVP IC)) positioned between the power supply module and the USB interface. The protection module may include a switching element (for example, a metal oxide semiconductor field effect transistor (MOSFET)) which is turned on when a voltage of a designated range is inputted and is turned off when a voltage out of the designated range (for example, a low voltage or an overvoltage) is input.

According to USB standards, when the power is provided, the electronic device providing the power should have an effective voltage in predetermined range (for example, 4.75 V-5.5 V inclusive). To achieve this, the electronic device should monotonically increase a voltage of the output power until the voltage reaches a minimum value (for example, 4.75 V) of the effective voltage. For example, the output voltage should not be reduced until the voltage reaches the minimum value of the effective voltage.

However, the electronic device may not comply with the USB standards. For example, the switching element of the protection module may not be directly turned on in response to the enabled power supply function, but may be turned on after a debounce time (or a deglitch time) has elapsed after a voltage (for example, a raised voltage) is received from the power supply module.

Since the switching element of the protection module is not turned on for the debounce time, power (for example, raised power) input to the protection module may be output (hereinafter, an output voltage) through a parasitic diode (or a body diode, an internal diode) included in the switching element of the protection module. In this case, the output voltage for the debounce time may be lower than the minimum value (for example, 4.75 V) of the effective voltage due to a voltage drop (for example, 0.7 V) caused by the parasitic diode. For example, when the raised voltage is 5.3 V, the output voltage for the debounce time may be 4.6 V (=5.3 V-0.7 V).

The raised voltage inputted to the protection module may not have a constant value and may cause a deviation (for example, a ripple). For example, the raised voltage may have a value which is higher or lower than 5.3 V. When a ripple occurs in the raised voltage for the debounce time, the output voltage may also ripple. Accordingly, the output voltage may not satisfy the designated effective voltage range (e.g., 4.75 V-5.5 V inclusive). That is, the electronic device may not comply with the USB standards that output power (voltage) should monotonically increase until the reaching a minimum value (for example, 4.75 V) of the effective voltage.

Increasing the raised voltage to prevent the output voltage for the debounce time from being lower than the minimum value of the effective voltage has the shortcoming that when the raised voltage increases but the voltage drop by the parasitic diode exceeds 0.75 V, the output voltage for the debounce time may be lower than the minimum value of the effective voltage. Further increasing the raised voltage to 5.7 V may be considered has the shortcoming that the voltage drop does not occur by the parasitic diode at a time when the switching element of the protection module is turned on, and the output voltage may increase to the same or similar voltage (for example, about 5.7 V) as or to the raised voltage, and there may be a problem that the output voltage exceeds the effective voltage (for example, 4.75 V to 5.5 V inclusive).

Certain embodiments of the disclosure provide an electronic device which is capable of turning on a switching element of a protection module before a raised voltage is supplied from a power supply module (or providing a raised voltage to the protection module after the switching element of the protection module is turned on).

SUMMARY

According to certain embodiments, an electronic device comprises: a battery; an interface module; a detection module electrically connected with the interface module, the detection module configured to detect than an external electronic device for receiving power is connected to the interface module; a protection module electrically connected with the interface module and comprising a first switching element; and a charging module electrically connected with the protection module, the detection module, and the battery, and comprising a voltage conversion circuit and a second switching element, the charging module configured to provide a first power to the protection module when the detection module detects connection of the external electronic device, wherein the first switching element is configured to turn on after receiving the first power, wherein the charging module is configured to raise a power from the battery to a designated value through the voltage conversion circuit, thereby resulting in a second power, and, when a designated first time is elapsed after the power from the battery is raised to the designated value, turn on the second switching element, thereby providing the second power to the protection module.

According to certain embodiments, an electronic device comprises: a battery; an interface module; a power module; a detection module electrically connected with the interface module the detection module configured to detect that an external electronic device requiring a power supply is connected to the interface module; a protection module electrically connected with the interface module and comprising a first switching element, wherein the protection module is configured to turn on the first switching element in response to receiving a first power from the power module; a charging module electrically connected with the protection module, the detection module, the power module, and the battery, and comprising a voltage conversion circuit and a second switching element, the charging module configured to enable the power module in response to the detection module detecting the external electronic device; and wherein the charging module is configured to use the voltage conversion circuit to raise power from the battery to a designated value, thereby resulting in a second power, and, when a designated first time is elapsed after the power of the battery is raised to the designated value, turn on the second switching element, thereby supplying the second power to the protection module.

According to certain embodiments, an electronic device comprises: a battery; an interface module; a power module; a detection module electrically connected with the interface module the detection module configured to detect that an external electronic device is connected to the interface module for receiving a power supply; a protection module electrically connected with the interface module and comprising a first switching element; a processor; and a charging module electrically connected with the protection module, the detection module, the power module, the processor, and the battery, and comprising a voltage conversion circuit and a second switching element; wherein the charging module is configured to notify the processor of connection of the external electronic device in response to the detecting, wherein, in response to the notification, the processor is configured to enable the power module and to supply a first power to the protection module, wherein the protection module is configured to turn on the first switching element in response to the first power being supplied from the power module, wherein the charging module is configured to use the voltage conversion circuit to raise power from the battery to a designated value, thereby resulting in a second power, and, when a designated first time is elapsed after the power of the battery is raised to the designated value, turn on the second switching element, thereby supplying the second power to the protection module.

DETAILED DESCRIPTION

Figure 1:
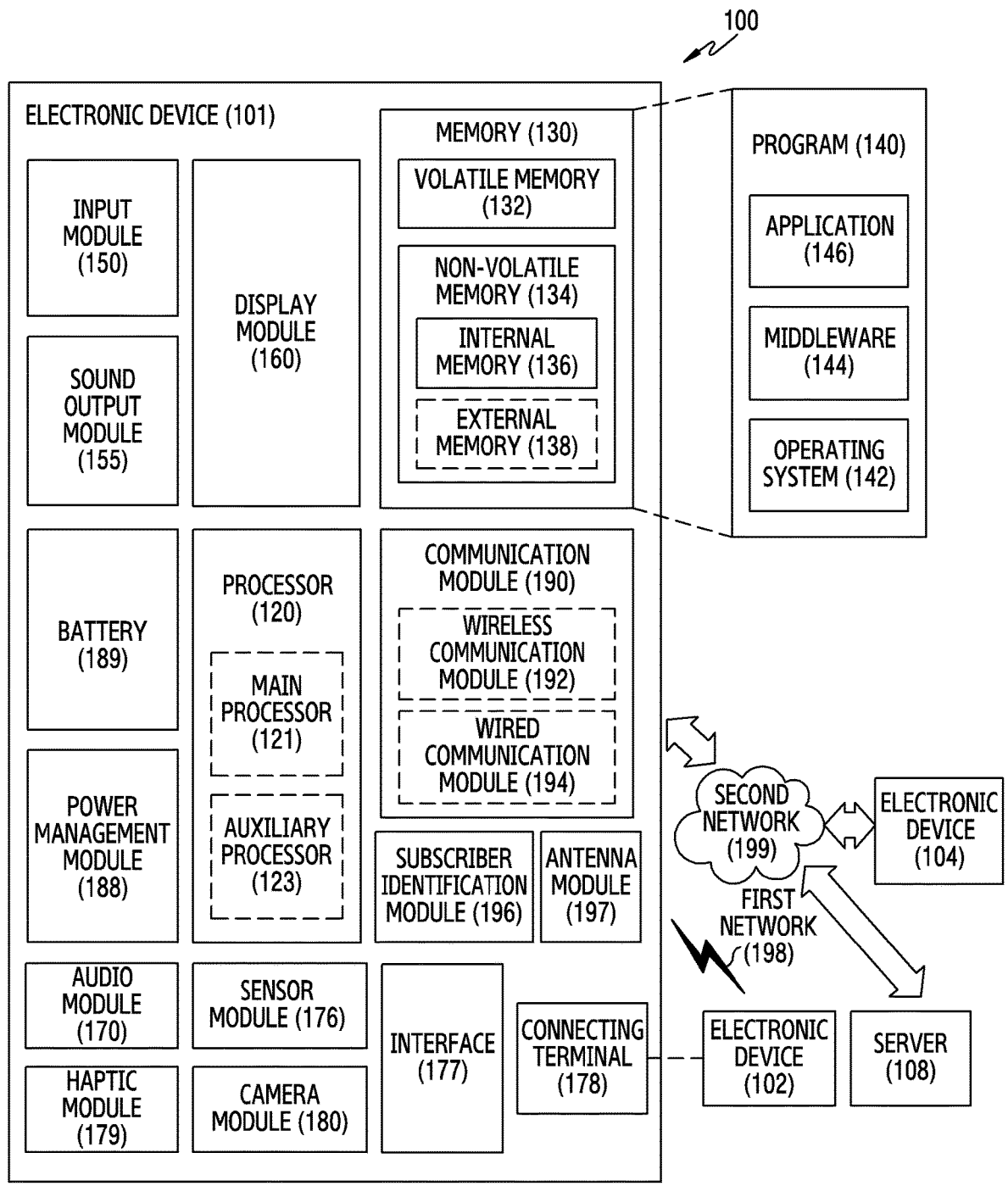
FIG. 1 is a block diagram of an electronic device in a network environment according to certain embodiments of the disclosure.

According to certain embodiments of the disclosure, a switching element of a protection module may be turned on before a raised power is supplied from a power supply module (or a raised power is provided to the protection module from the power supply module after the switching element of the protection module is turned on). As a result, an output voltage satisfies an effective voltage range (4.75 to 5.5 inclusive).

According to certain embodiments of the disclosure, a switching element of a protection module may be turned on before a raised power is supplied from a power supply module (or a raised power is provided to the protection module from the power supply module after the switching element of the protection module is turned on), so that a problem that an output voltage does not monotonically increase until it reaches an effective voltage range may be solved.

As a result, certain embodiments of the disclosure may authenticate in accordance with USB standards.

Hereinafter, certain embodiments of the disclosure will be described with reference to the accompanying drawings. Specific embodiments are illustrated in the drawings and detailed descriptions thereof are provided herein, but this does not intend to limit certain embodiments of the disclosure to specific forms. For example, it will be obvious to a person skilled in the art that various changes can be made to embodiments of the disclosure.

FIG. 1 describes an electronic device that is configure to provide power to an external electronic device. Alternatively, the electronic device can also be configured to receive power from the external electronic device.

Electronic Device

FIG. 1 is a block diagram of an electronic device in a network environment according to certain embodiments of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device 101 can provide power to another electronic device, e.g., electronic device 102, or receive power from another electronic device. For example, the connecting terminal 178 can comprises a USB interface. When electronic device 102 is connected to electronic device 101 via the USB interface, electronic device 101 may either provide power or receive power. That is, the power management module 188 causes the battery to provide apply a voltage to the electronic device 102.

Figure 2:
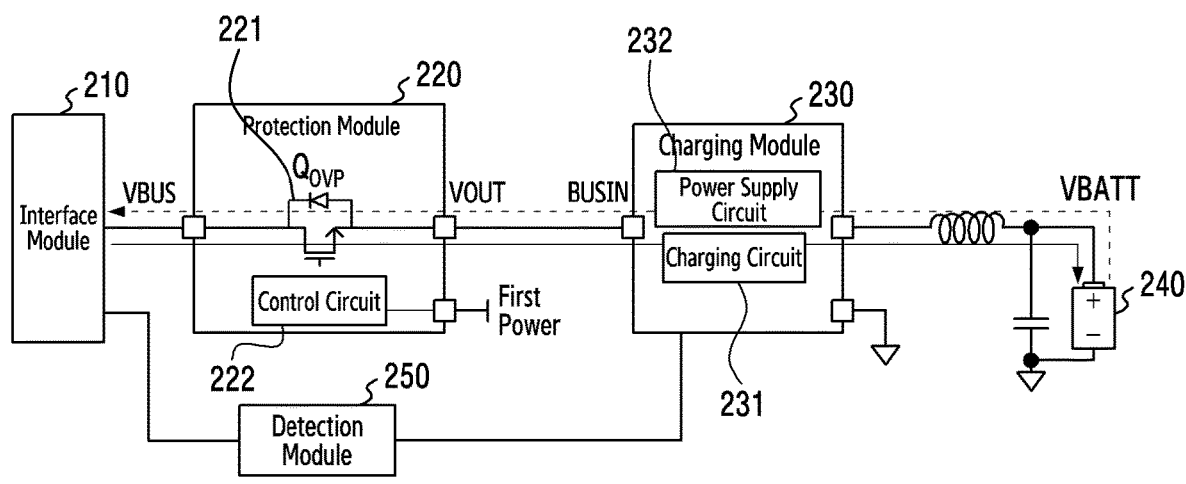
FIG. 2 is a block diagram illustrating some components of an electronic device according to certain embodiments of the disclosure.

FIG. 2 describes components of the electronic device 101 that provide power to an external electronic device, such as electronic device 102. The components include the battery 240 that applies a voltage to the connecting terminal 178 or interface module. Detection module 250 detects connection of the electronic device 102. A charging module 230 provides an output voltage. A protection module 220 prevents overvoltage.

While providing power to another electronic device, the control circuit 222 receives a first power. The first power causes the switching element 221 to be turned on. After the switching element 221 is turned on, the charging module 230 provides a second power.

FIG. 2 is a block diagram illustrating some components of an electronic device according to certain embodiments of the disclosure.

Referring to FIG. 2, the electronic device 200 (for example, the electronic device 101 of FIG. 1) according to an embodiment of the disclosure may include an interface module 210 (for example, the connection terminal 178 of FIG. 1), a protection module 220, a charging module 230, a battery 240 (for example, the battery 189 of FIG. 1), and a detection module 250.

The electronic device 200 may provide power to an external electronic device or receive power from a charger (for example, an on-the-go (OTG) function). For example, when the detection module 250 detects that a charger is connected to the interface module 210, the electronic device 200 allows a charging circuit 231 of the charging module 230 to charge the battery 240. The charger supplies power through the interface module 210 and the protection module 220. When charging, the protection module 220 may be turned on if a voltage within a designated range (for example, 2.5 V to 20 V inclusive) is inputted from the charger, and may be turned off if a voltage out of the designated range (for example, a low voltage or an overvoltage) is inputted.

In another example, when the detection module 250 detects that an external device (for example, a USB memory, an external hard drive, a mouse, or a keyboard) for receiving power is connected to the interface module 210, the electronic device 200 may convert power (for example, a voltage) of the battery 240 through a power supply circuit 232 of the charging module 230, and supply (provide) the converted power (hereinafter, output power (or an output voltage)) to the external device through the protection module 220 and the interface module 210.

A control circuit 222 of the protection module 220 may receive a first power when an external device is connected and the power supply function is enabled. When the power supply function is enabled, a switching element 221 of the protection module 220 may be turned on as a result of the first power. Afterwards, a second power (or a raised power), which results from raising of power of the battery 240 to a designated value by the power supply circuit 232, is provided from the charging module 230. For example, the switching element 221 of the protection module 220 may be turned on by the control circuit 222. The control circuit 222 receives the first power before the second power is provided from the charging module 230. The first power may be provided by an internal bias (see FIGS. 3A to 5) positioned in the charging module 230, or a separate power module (see FIGS. 6 to 11).

The switching element 221 may be turned on as a result of the first power before the second power is provided, rather than being turned when the second power is provided. As a result the electronic device 200 may comply with USB standards.

Figure 3A:
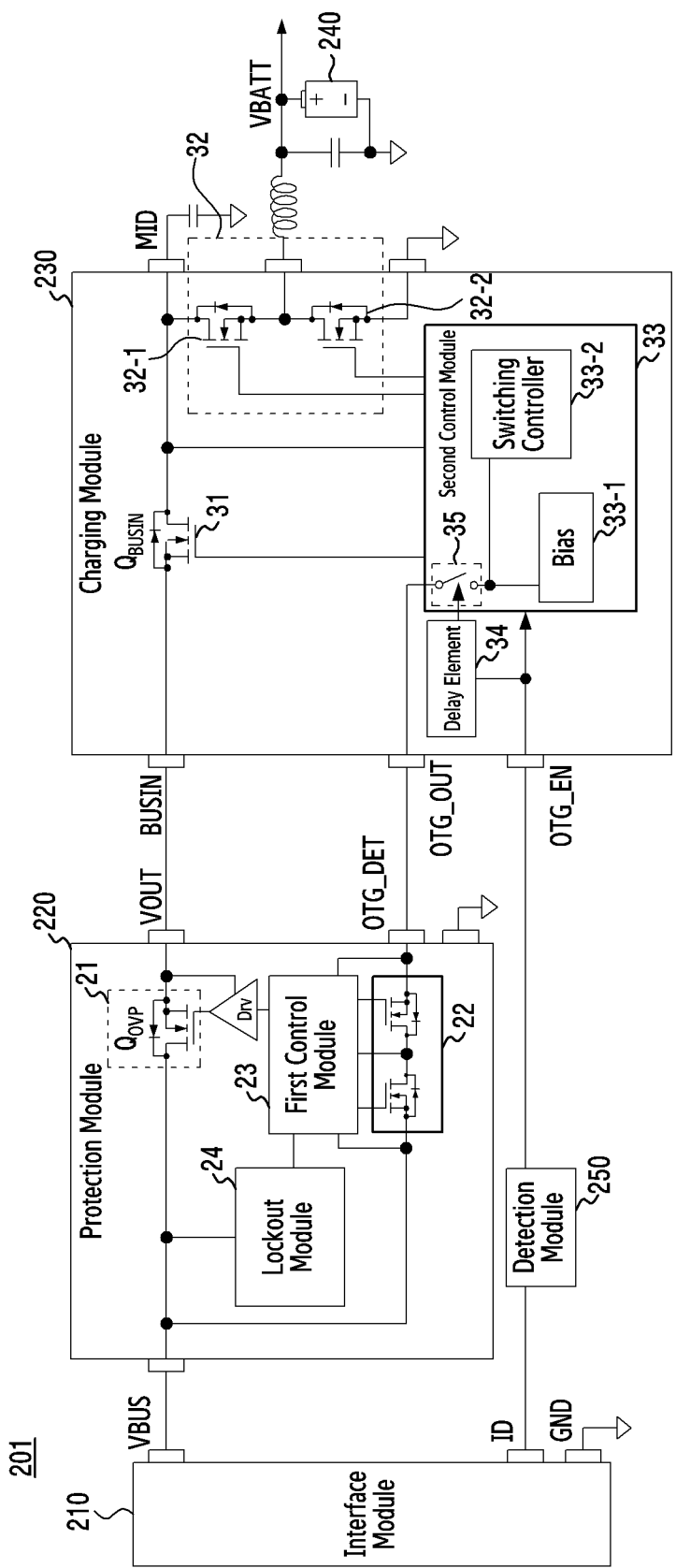
FIG. 3A is a block diagram of an electronic device which provides power to an external device according to an embodiment of the disclosure.
Figure 3B:
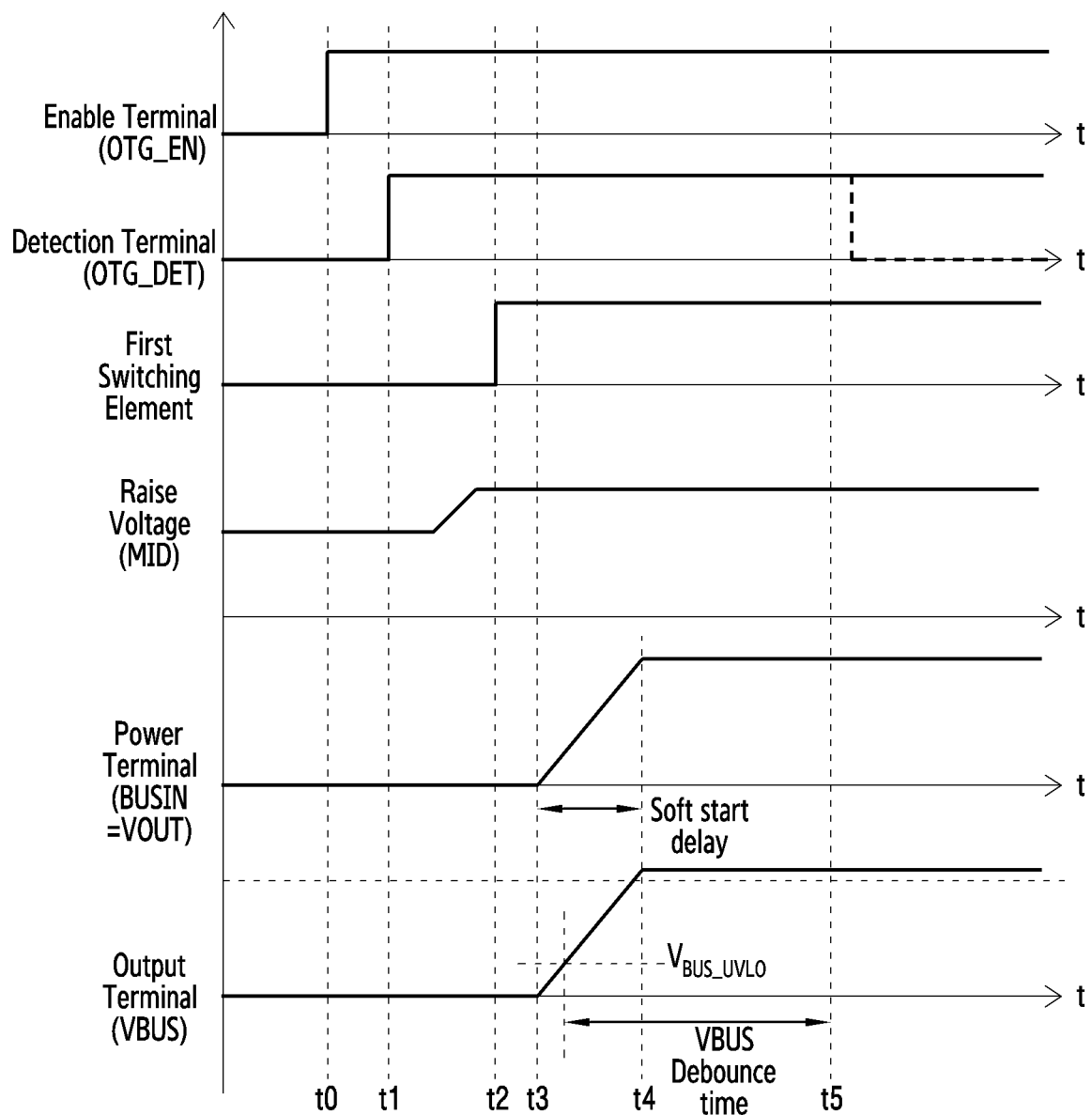
FIG. 3B is a timing chart illustrating operations of various components of the electronic device according to an embodiment of the disclosure.

FIG. 3A is a block diagram of an electronic device which provides power to an external device according to an embodiment of the disclosure, and FIG. 3B is a timing chart illustrating operations of various components of the electronic device according to an embodiment of the disclosure.

When the detection module 250 detects connection of an external device for receiving power to the interface module 210, the detection module 250 transmits an enable signal to the charging module 230. In response to receiving the enable signal, the charging module 230 provides a first power to the protection module 220. The first power causes the switching element to turn on. When the switching element turns on, the charging module 230 provides a second power.

Referring to FIGS. 3A and 3B, the electronic device 201 (for example, the electronic device 101 of FIG. 1, the electronic device 200 of FIG. 2) according to an embodiment of the disclosure may include an interface module 210 (for example, the connection terminal 178 of FIG. 1), a protection module 220, a charging module 230, a battery 240 (for example, the battery 189 of FIG. 1), and a detection module 250.

An external device may be physically connected to the interface module 210. For example, the interface module 210 may be a USB connector.

The detection module 250 may detect connection of an external device (for example, the electronic device 102 of FIG. 1). For example, the detection module 250 may detect that an external device (hereinafter, an OTG device) is connected for receiving power from the electronic device 201. The detection module 250 may recognize that the OTG device is connected when an identification (ID) terminal of the interface module 210 is grounded to a ground of the external device. The method of detecting the OTG device is not limited thereto, and well-known various methods may be used. When the detection module 250 detects connection of the OTG device, the detection module 250 may transmit an enable signal an enable terminal (OTG_EN) of the charging module 230. The enable signal enables a power supplying by the charging module 230 to. The charging module 230 may receive the enable signal at a time t0 as shown in FIG. 3B.

The protection module 220 may protect the charging module 230 from electrical damage (for example, an electrical overstress (EOS), an electrostatic discharge (ESD)). The protection module 220 may include a first switching element 21 (for example, the switching element 221 of FIG. 2), a power selection circuit 22, a first control module 23, and a lockout module 24.

The lockout module 24 may monitor a voltage of an output terminal VBUS. When a voltage out of a designated range is input, the lockout module 24 may turn off the first switching element 21 through the first control module 23. For example, the lockout module 24 may include a low-voltage lockout module to detect a low-voltage input and/or an overvoltage lockout module to detect an overvoltage input.

The first switching element 21 may be positioned between the output terminal VBUS of the interface module 210 and a power terminal BUSIN of the charging module 230. The first switching element 21 may be turned on or turned off by the first control module 23. For example, the first switching element 21 may be turned on (or shorted) to connect a path between the output terminal VBUS of the interface module 210 and the power terminal BUSIN of the charging module 230, or may be turned off (or creating an open circuit) to block the path between the output terminal VBUS of the interface module 210 and the power terminal BUSIN of the charging module 230. The first switching element 21 may be, for example, a field effect transistor (FET).

The power selection circuit 22 may select one (for example, a power having the largest value) of a plurality of powers inputted. After selection, the power selection circuit 22 may supply the selected power to the first control module 23. For example, the power selection circuit 22 may supply one of a power inputted from the output terminal VBUS of the interface module 210 (or an output power of the protection module 220), or a first power inputted from the charging module 230 through a detection terminal OTG_DET to the first control module 23. The power selection circuit 22 may receive the first power from the charging module 230 through the detection terminal OTG_DET at a time t1 as shown in FIG. 3B.

The first control module 23 may control driving (for example, turn-on or turn-off) of the first switching element 21. For example, when a charging function is enabled, the first control module 23 may be driven (enabled) by a power inputted from the output terminal VBUS of the interface module 210 to turn on the first switching element 21. When an input signal is received from the lockout module 24 (for example, when an input of a low-voltage or an overvoltage is detected), the first control module 23 may turn off the first switching element 21. In another example, when a power supply function is enabled, the first control module 23 may be driven by the first power and may turn on the first switching element 21. The first power may be input from the charging module 230 through the detection terminal OTG_DET. The first control module 23 may be driven by the first power received through the detection terminal OTG_DET.

The power selection circuit 22 at the time t1, and may turn on the first switching element 21 at a time t2 as shown in FIG. 3B.

The charging module 230 may provide allow charging and provision of power. The charging module 230 may include a second switching element 31, a voltage conversion circuit 32, a second control module 33, a delay element 34, and a switch 35.

The second switching element 31 may be positioned between the protection module 220 and the battery 240. The second switching element may be turned on or turned off by the second control module 33. For example, the second switching element 31 may be turned on to connect a path between the protection module 220 and the battery 240, or may be turned off to block the path between the protection module 220 and the battery 240. According to certain embodiments, the second switching element 31 may be, for example, a field effect transistor (FET).

The second control module 33 may control an overall function (or operation) of the charging module 230. For example, when a charging device is connected, the second control module 33 may enable the charging function and may control to charge the battery 240 by using power transmitted from the charging device. In another example, when an enable signal informing connection of the OTG device is received through the enable terminal OTG_EN, the second control module 33 may enable transmission of power to the OTG device, using power from the battery 240.

When providing power, the second control module 33 may increase (raise) a voltage of the battery 240 to a designated value. For example, the second control module 33 may controlling the voltage conversion circuit 32 to raise the voltage from the battery 240 to the designated value. The voltage conversion circuit 32 includes a third switching element 32-1 and a fourth switching element 32-2. The voltage conversion circuit may use a switching controller 33-2 (for example, a pulse width modulation (PWM) controller) operated by a bias 33-1.

The voltage conversion circuit 32 may convert (for example, raise) the voltage from the battery 240 when the power supply function is enabled. For example, the voltage conversion circuit 32 may raise the voltage from the battery 240 (for example, 3.8 V-4.2 V inclusive) to a designated value (for example, 5.3 V) when the power supply function is enabled. The voltage conversion circuit 32 may raise the voltage from the battery 240 to the designated value between the time t1 and the time t2 as shown in FIG. 3B. The voltage conversion circuit 32 for raising the voltage of the battery 240 may include at least one of a boost converter circuit, a boost circuit, or a step-up converter circuit.

The second control module 33 may turn on the second switching element 31 when a designated time (hereinafter, a first time) has elapses after raising voltage from the battery 240 to a designated voltage (for example, 4.75 V). For example, the second control module 33 may turn on the second switching element 31 (for example, output the voltage of the power terminal BUSIN) at a time t3 as shown in FIG. 3B. Accordingly, the second control module 33 may turn on the second switching element 31 after the first switching element 21 is turned on.

The delay element 34 (for example, a delay circuit) may output an input signal after delaying the input signal by a designated time (hereinafter, a second time). For example, the delay element 34 may be connected with the enable terminal OTG_EN, and may delay an enable signal by the second time. After the second time, the delay element 34 may output the enable signal to the switch 35 to turn on the switch 35. The designated second time may be a difference between t0 and t1. In another example, the delay element 34 may be connected with the enable terminal OTG_EN, and may delay an enable signal by the designated second time and then may output the enable signal to the switching controller 33-2 or the second control module 33. The switching controller 33-2 or the second control moule 33 may receive the enable signal which is delayed by the second time and then may turn on the switch 35.

The switch 35 may be positioned between the bias 33-1 and the detection terminal OTG_DET of the protection module 220. The switch 35 may be turned on or off by the delay element 34. When the switch 35 is turned on, the switch 35 may supply the bias 33-1 to the detection terminal OTG_DET of the protection module 220. For example, when the switch 35 is turned on by the delay element 34, the switch 35 may supply the bias 33-1 to the power selection circuit 22 of the protection module 220 as the first power. The bias 33-1 supplied as the first power may supply a current greater than or equal to a minimum value (for example, 1 mA) of a current required to operate the first control module 23 of the protection module 220. According to a certain embodiment, the switch 35 may be positioned outside the second control module 33.

After the second switching element 31 is turned on, the charging module 230 may control the power terminal BUSIN to gradually increase a second power (for example, soft start) and to output the second power to the protection module 220, based on USB standards (for example, a voltage increasing speed of the output terminal VBUS is restricted to 30 mV/us or less). For example, the charging module 230 may control to gradually increase a voltage of the power terminal BUSIN and to output the voltage between a time t3 and a time t4.

Since the first switching element 21 of the protection module 220 is turned on (for example, the time t2) before the second switching element 31, there is very little, if any, voltage drop by a parasitic diode of the first switching element 21. A voltage (output voltage) of the output terminal VBUS for the debounce time may be similar to (or the same as) a voltage of the power terminal BUSIN. The voltage (output voltage) of the output terminal VBUS may not be lower than a minimum value of an effective voltage between a time (for example, the time t4) at which soft start of the voltage of the power terminal BUSIN is completed and a time (for example, a time t5) at which the debounce time is finished. Even when a ripple occurs in the voltage of the power terminal BUSIN during the section between "t4" and "t5", the voltage of the output terminal VBUS can exceed the minimum value of the effective voltage. Accordingly, the electronic device satisfies the requirements of the USB standards. That is, the output voltage monotonically increases until reaching a minimum value of an effective voltage.

The power selection circuit 22 of the protection module 220 may supply the output power to the first control module 23 at a time when the output power (for example, the voltage of the output terminal VBUS) is greater than the first power.

After the debounce time is elapsed (for example, after the time t5 of FIG. 3B is elapsed), the charging module 230 might not supply the first power to the first control module 23. For example, when the debounce time is elapsed and the output power is stabilized, the charging module 230 may disable a terminal OTG_OUT outputting the first power. Since the output power is greater than the first power after the debounce time is elapsed, the first control module 23 may receive the output power from the power selection circuit 22 and may keep the first switching element 21 turned on. In another example, when the output power is greater than or equal to the minimum value of the effective voltage, the charging module 230 may disable the terminal OTG_OUT outputting the first power even before the debounce time is elapsed. Even when the terminal OTG_OUT is disabled and the first power is not supplied, the first control module 23 may receive the output power from the power selection circuit 22 and may keep the first switching element 21 turned on.

Figure 4:
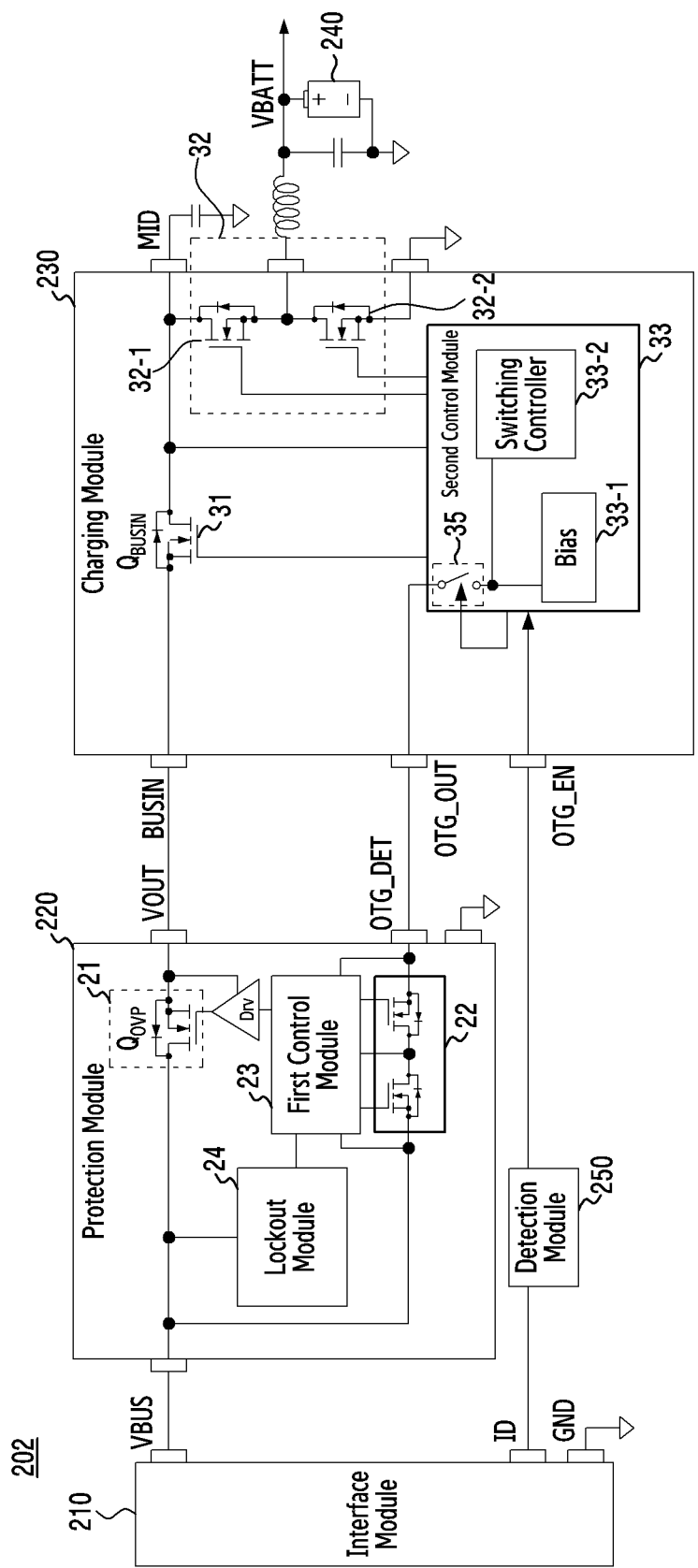
FIG. 4 is a block diagram of an electronic device which provides power to an external device according to another embodiment of the disclosure.

FIG. 4 is a block diagram of an electronic device which provides power to an external device according to another embodiment of the disclosure. The charging module 230 may omit delay element 34.

Referring to FIG. 4, the electronic device 202 (for example, the electronic device 101 of FIG. 1, the electronic device 200 of FIG. 2) according to another embodiment of the disclosure may be similar to the electronic device 201 of FIG. 3A. For example, the electronic device 202 may include an interface module 210, a protection module 220, a first switching element 21, a power selection circuit 22, a first control module 23, a lockout module 24, a charging module 230, a second switching element 31, a voltage conversion circuit 32, a second control module 33, a bias 33-1, a switching controller 33-2, a switch 35, a battery 240, and a detection module 250.

The electronic device 202 of FIG. 4 may not include a delay element (for example, the delay element 34 of FIG. 3A) and the second control module 33 may control turning on/off of the switch 35. For example, when a power supply function is enabled (for example, an enable signal OTG_EN is received from the detection module 250), the second control module 33 may turn on the switch 35. In another example, when a designated second time is elapsed after the power supply function is enabled (for example, after the enable signal OTG_EN is received from the detection module 250), the second control module 33 may turn on the switch 35.

When a debounce time is elapsed (for example, when an output power outputted to the interface module 210 from the protection module 220 is stabilized), the second control module 33 of the charging module 230 may stop supplying the first power. For example, when the debounce time elapses, the second control module 33 may turn off the switch 35. When the switch 35 is turned off, the power selection circuit 22 of the protection module 220 may supply a power (output power) of the output terminal VBUS to the first control module 23.

The electronic device 202 of FIG. 4 is similar to the electronic device 201 of FIG. 3A except for the above-described difference, and a detailed description of other components illustrated in FIG. 4 is omitted.

Figure 5:
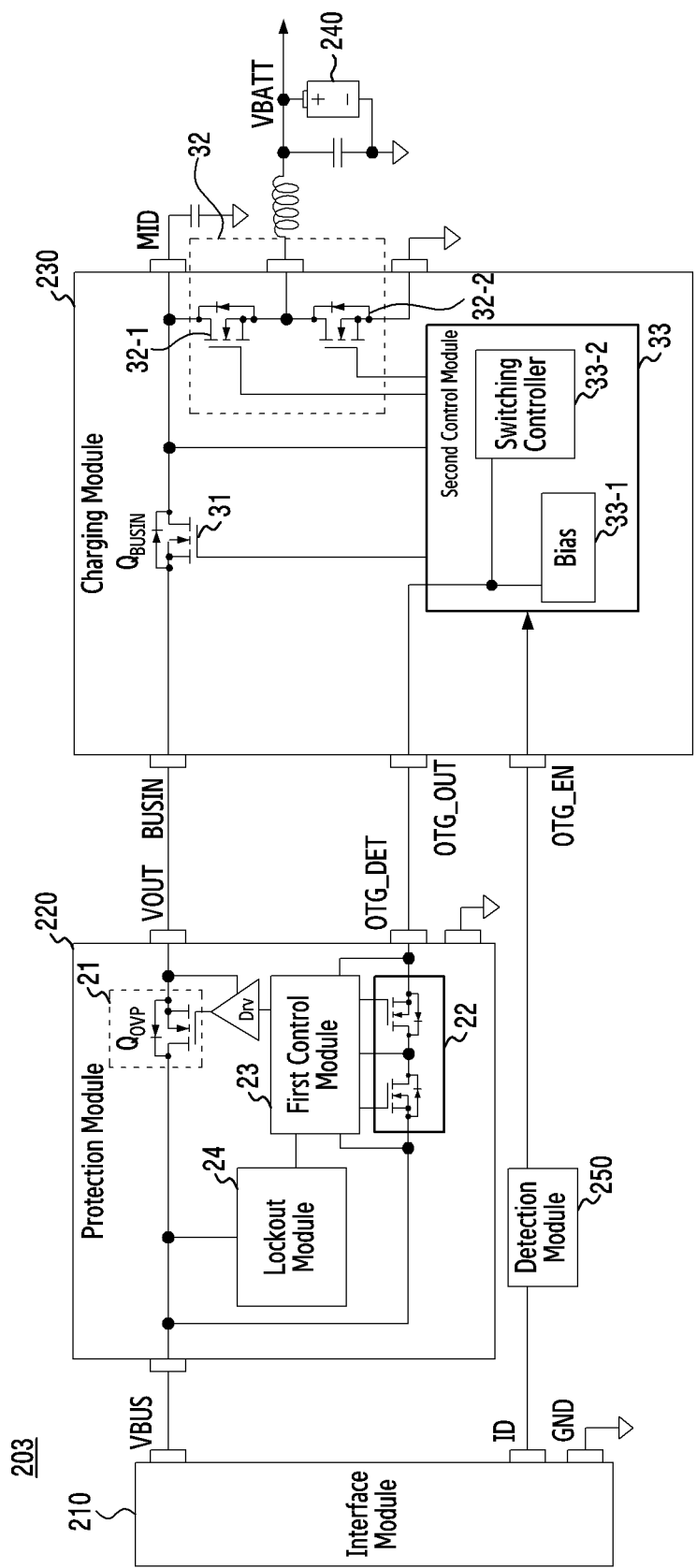
FIG. 5 is a block diagram of an electronic device which provides power to an external device according to still another embodiment of the disclosure.

FIG. 5 is a block diagram of an electronic device which provides power to an external device according to still another embodiment of the disclosure. In this embodiment, the electronic device 203 omits the delay element 34 and switch 35.

Referring to FIG. 5, the electronic device 203 (for example, the electronic device 101 of FIG. 1, the electronic device 200 of FIG. 2) according to still another embodiment of the disclosure may be similar to the electronic device 201 of FIG. 3A. For example, the electronic device 203 may include an interface module 210, a protection module 220, a first switching element 21, a power selection circuit 22, a first control module 23, a lockout module 24, a charging module 230, a second switching element 31, a voltage conversion circuit 32, a second control module 33, a bias 33-1, a switching controller 33-2, a battery 240, and a detection module 250.

In the electronic device 203 of FIG. 5, a power of the bias 33-1 or the switching controller 33-2 of the second control module 33 may be electrically connected with the power selection circuit 22 of the protection module 220. For example, when an enable signal OTG_EN is received through the detection module 250 and a power supply function is enabled, the bias 33-1 or the switching controller 33-2 of the charging module 230 may supply a first power to the protection module 220.

When the power supply function is enabled (for example, when the enable signal OTG_EN is received from the detection module 250), the charging module 230 may enable or disable a terminal OTG_OUT outputting the first power. For example, when the power supply function is enabled, the charging module 230 may enable the terminal OTG_OUT outputting the first power after a designated second time is elapsed. In another example, when a debounce time is elapsed (for example, when an output power is stabilized), the charging module 230 may disable the terminal OTG_OUT outputting the first power and may stop outputting the first power.

The electronic device 203 of FIG. 5 is similar to the electronic device 201 of FIG. 3A except for the above-described difference, and a detailed description of other components illustrated in FIG. 5 is omitted.

Figure 6:
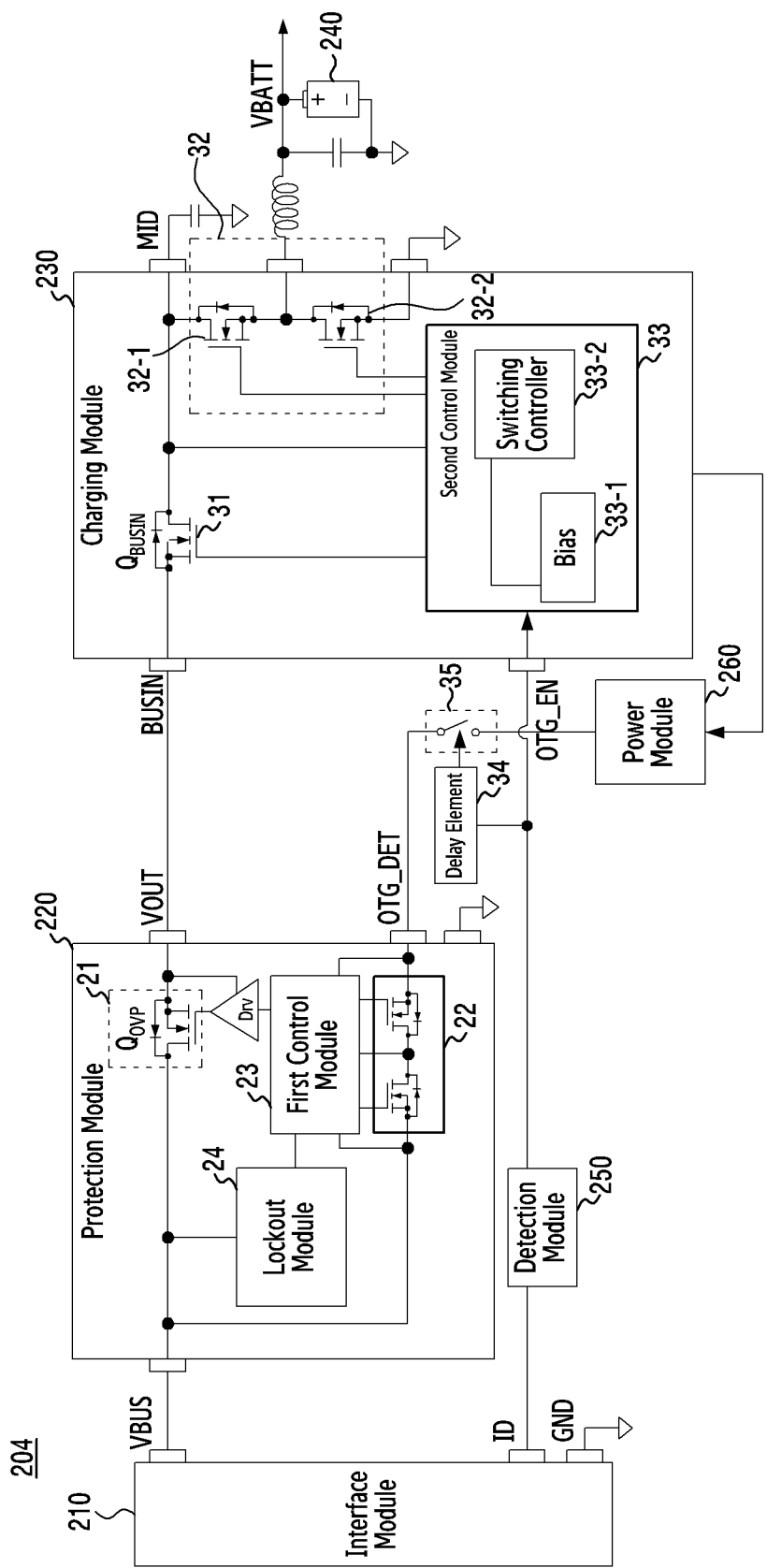
FIG. 6 is a block diagram of an electronic device which provides power to an external device according to yet another embodiment of the disclosure.

FIG. 6 is a block diagram of an electronic device which provides power to an external device according to yet another embodiment of the disclosure. The electronic device might not use the bias 33-1 of the second control module 33 as a first power.

Referring to FIG. 6, the electronic device 204 (for example, the electronic device 101 of FIG. 1, the electronic device 200 of FIG. 2) according to yet another embodiment of the disclosure may be similar to the electronic device 201 of FIG. 3A. For example, the electronic device 204 may include an interface module 210, a protection module 220, a first switching element 21, a power selection circuit 22, a first control module 23, a lockout module 24, a charging module 230, a second switching element 31, a voltage conversion circuit 32, a second control module 33, a bias 33-1, a switching controller 33-2, a delay element 34, a switch 35, a battery 240, a detection module 250, and a power module 260.

The electronic device 204 of FIG. 6 may not use the bias 33-1 of the second control module 33 as a first power. The electronic device 204 of FIG. 6 may include the separate power module 260, and the delay element 34 and the switch 35 may be configured outside the charging module 230.

When an enable signal OTG_EN is received through the detection module 250 and a power supply function is enabled, the charging module 230 may turn on the power module 260.

When the power module 260 is turned on by the charging module 230, the power module 260 may supply a power (corresponding to the first power of FIG. 3A) to the power selection circuit 22 of the protection module 220 through the switch 35 which is turned on (or closed) by the delay element 34 after a designated second time is elapsed.

The electronic device 204 of FIG. 6 is similar to the electronic device 201 of FIG. 3A except for the above-described difference, and a detailed description of other components is omitted.

Figure 7:
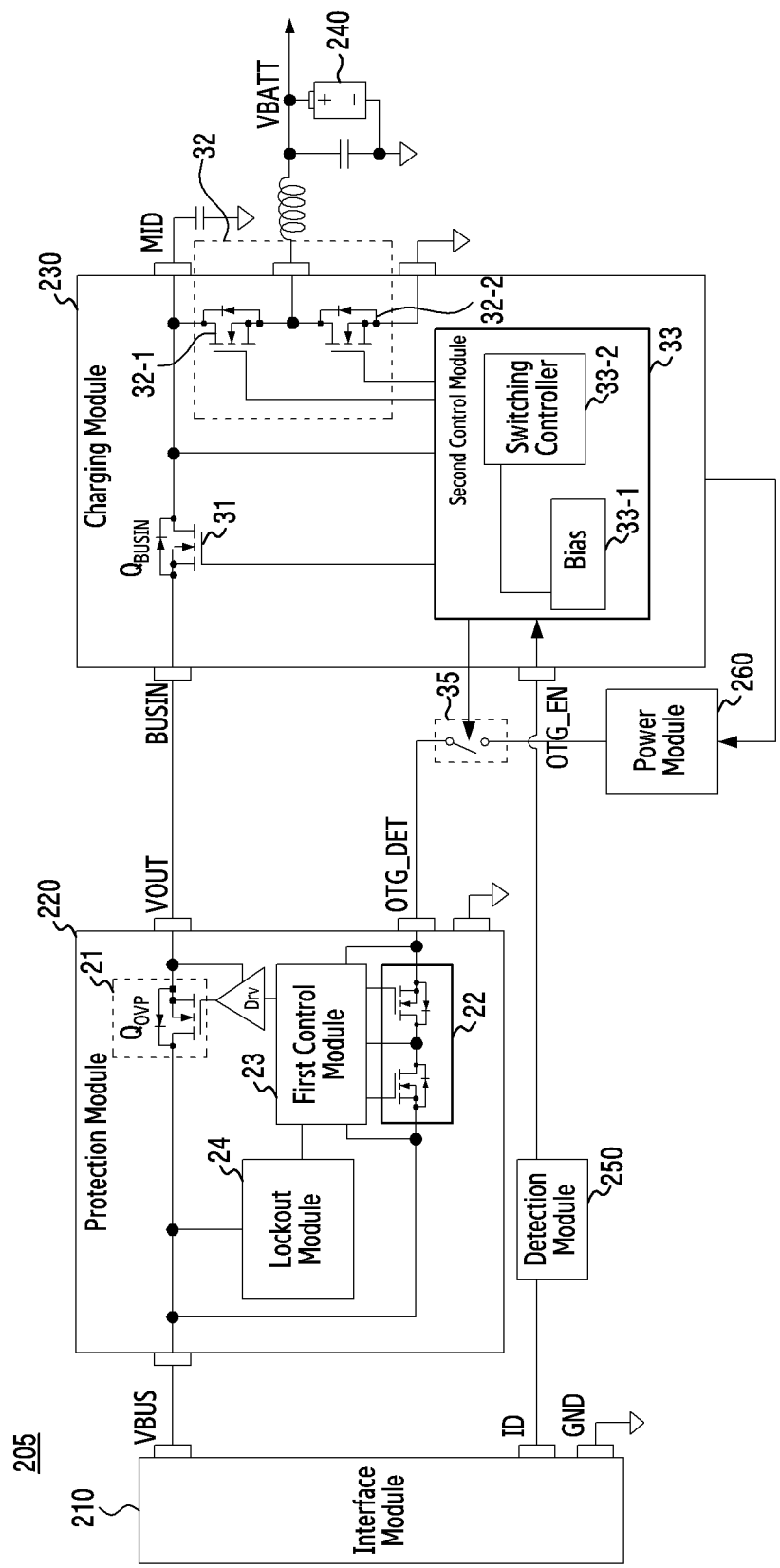
FIG. 7 is a block diagram of an electronic device which provides power to an external device according to a further embodiment of the disclosure.

FIG. 7 is a block diagram of an electronic device which provides power to an external device according to a further embodiment of the disclosure. The electronic device might not use the bias 33-1 of the second control module 33 as a first power, and may include a separate power module 260.

Referring to FIG. 7, the electronic device 205 (for example, the electronic device 101 of FIG. 1, the electronic device 200 of FIG. 2) according to a further embodiment of the disclosure may include an interface module 210, a protection module 220, a first switching element 21, a power selection circuit 22, a first control module 23, a lockout module 24, a charging module 230, a second switching element 31, a voltage conversion circuit 32, a second control module 33, a bias 33-1, a switching controller 33-2, a switch 35, a battery 240, a detection module 250, and a power module 260.

The electronic device 205 of FIG. 7 may not use the bias 33-1 of the second control module 33 as a first power, and may include the separate power module 260, which is the same as the electronic device 204 of FIG. 6. In addition, the electronic device 205 of FIG. 7 may not include a delay element (for example, the delay element 34 of FIG. 3A), and the second control module 33 may control tuning on/off of the switch 35, which is the same as the electronic device 202 of FIG. 4. The electronic device 205 of FIG. 7 is similar to the electronic device 204 of FIG. 6 and the electronic device 202 of FIG. 4 except for the above-described difference, and a detailed description of other components is omitted.

Figure 8:
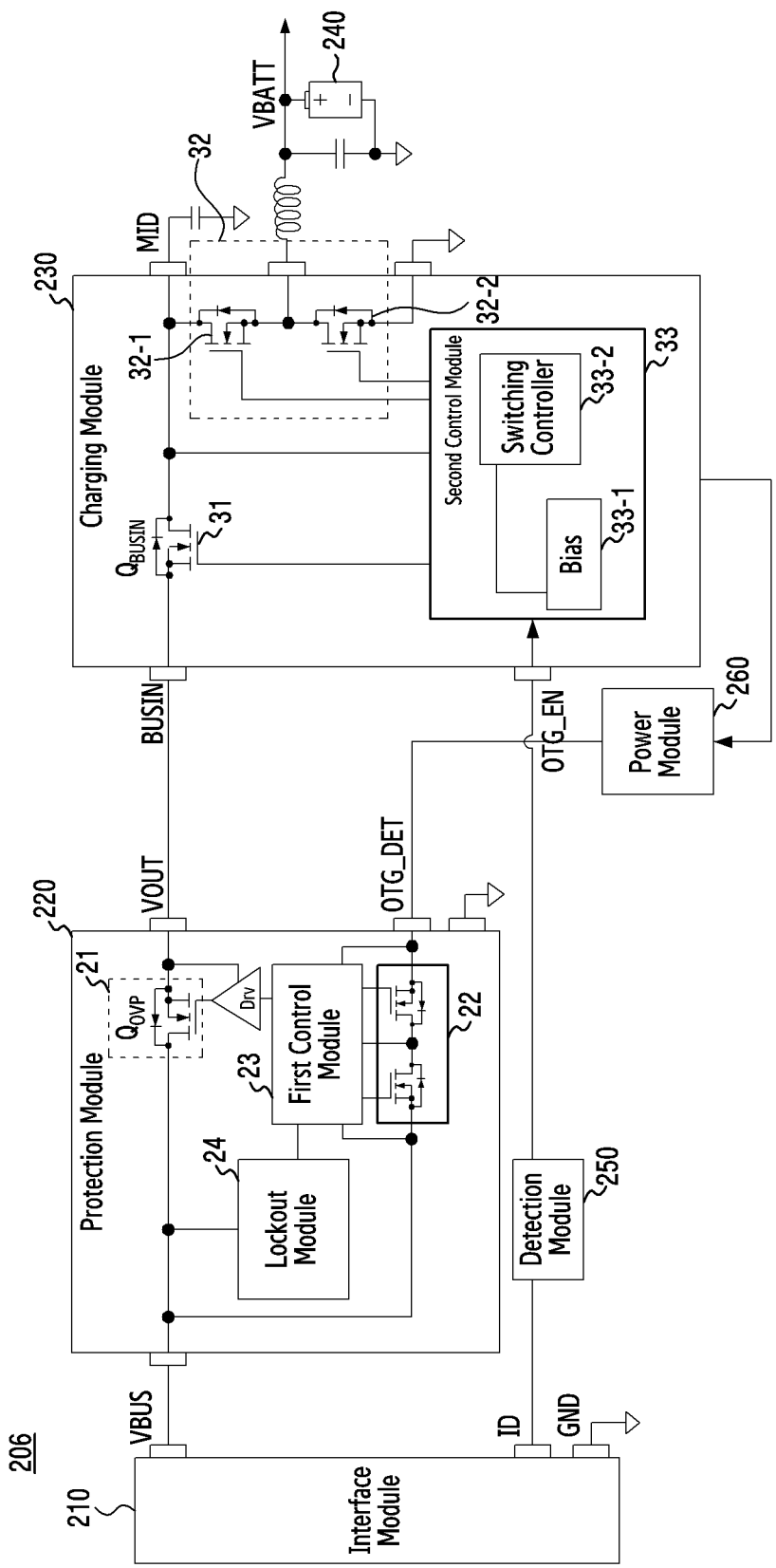
FIG. 8 is a block diagram of an electronic device which provides power to an external device according to a still further embodiment of the disclosure.

FIG. 8 is a block diagram of an electronic device which provides power to an external device according to a still further embodiment of the disclosure.

Referring to FIG. 8, the electronic device 206 (for example, the electronic device 101 of FIG. 1, the electronic device 200 of FIG. 2) according to a still further embodiment of the disclosure may include an interface module 210, a protection module 220, a first switching element 21, a power selection circuit 22, a first control module 23, a lockout module 24, a charging module 230, a second switching element 31, a voltage conversion circuit 32, a second control module 33, a bias 33-1, a switching controller 33-2, a battery 240, a detection module 250, and a power module 260.

The electronic device 206 of FIG. 8 may not use the bias 33-1 of the second control module 33 as a first power and may include the separate power module 260, which is the same as the electronic device 204 of FIG. 6. In addition, the electronic device 206 of FIG. 8 may not include a delay element (for example, the delay element 34 of FIG. 3A), and the power module 260 may be electrically connected with the power selection circuit 22 of the protection module 220.

When an enable signal OTG_EN is received through the detection module 250 and a power supply function is enabled, the charging module 230 may turn on the power module 260 to supply the first power to the protection module 220. According to a certain embodiment, the charging module 230 may turn on the power module 260 after a designated second time (for example, a delay time by the delay element 34 of FIG. 6) is elapsed. For example, the charging module 230 may turn on the power module 260 when counting of the second time is completed through an internal timer or an external timer.

When a debounce time is elapsed (for example, when an output power is stabilized), the charging module 230 may disable the power module 260 and may stop supplying the first power.

The electronic device 206 of FIG. 8 is similar to the electronic device 204 of FIG. 6 except for the above-described difference, and a detailed description of other components illustrated in FIG. 8 is omitted.

Figure 9:
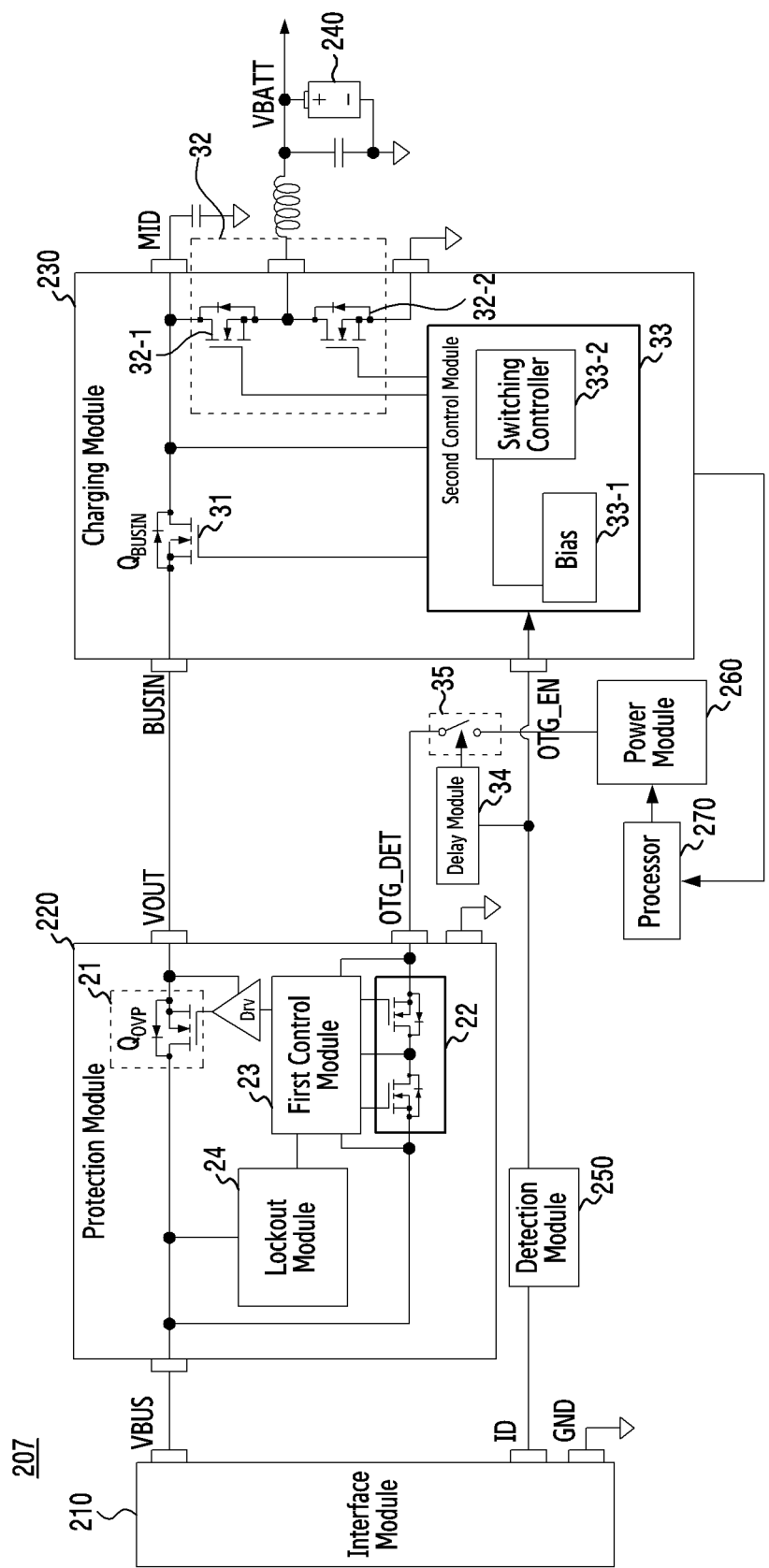
FIG. 9 is a block diagram of an electronic device which provides power to an external device according to a yet further embodiment of the disclosure.

FIG. 9 is a block diagram of an electronic device which provides power to an external device according to a yet further embodiment of the disclosure.

Referring to FIG. 9, the electronic device 207 (for example, the electronic device 101 of FIG. 1, the electronic device 200 of FIG. 2) according to a yet further embodiment of the disclosure may be similar to the electronic device 204 of FIG. 6. For example, the electronic device 207 may include an interface module 210, a protection module 220, a first switching element 21, a power selection circuit 22, a first control module 23, a lockout module 24, a charging module 230, a second switching element 31, a voltage conversion circuit 32, a second control module 33, a bias 33-1, a switching controller 33-2, a delay element 34, a switch 35, a battery 240, a detection module 250, a power module 260, and a processor 270.

The electronic device 207 of FIG. 9 may further include the processor 270 (for example, the processor 120 of FIG. 1).

The charging module 230 may transmit, to the processor 270, a signal informing that an OTG device is connected to the interface module 210 and a power supply function is enabled.

When the signal informing that the power supply function is enabled is received from the charging module 230, the processor 270 may turn on the power module 260 to supply a first power to the protection module 220. According to an embodiment, when a debounce time is elapsed (for example, when an output power is stabilized), the processor 270 may disable the power module 270 and may stop supplying the first power.

The electronic device 207 of FIG. 9 is similar to the electronic device 204 of FIG. 6 except that the power module 260 is turned on by the processor 270, and a detailed description of other components illustrated in FIG. 9 is omitted.

Figure 10:
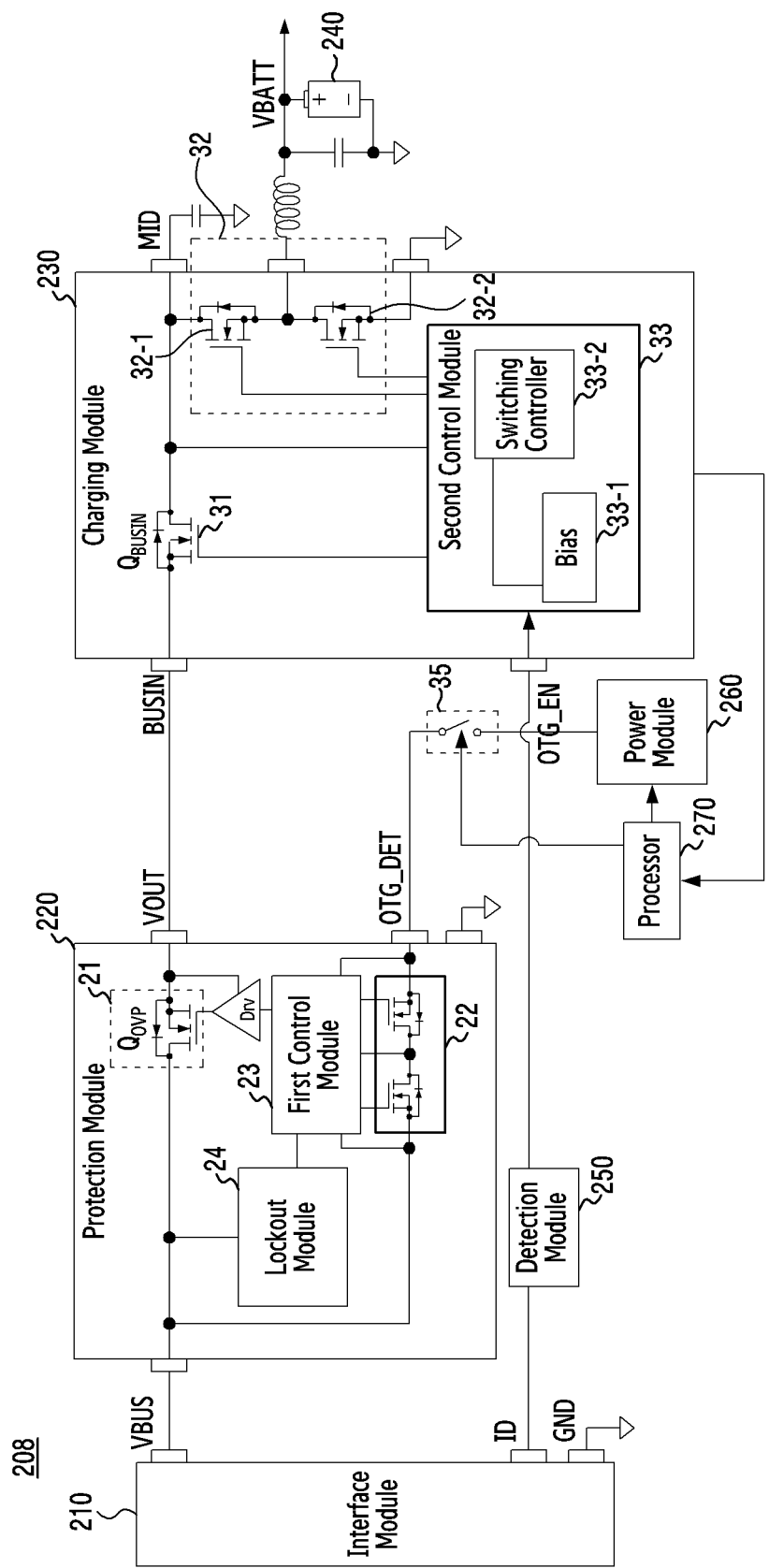
FIG. 10 is a block diagram of an electronic device which provides power to an external device according to another additional embodiment of the disclosure.

FIG. 10 is a block diagram of an electronic device which provides power to an external device according to another additional embodiment of the disclosure.

Referring to FIG. 10, the electronic device 208 (for example, the electronic device 101 of FIG. 1, the electronic device 200 of FIG. 2) according to another additional embodiment of the disclosure may include an interface module 210, a protection module 220, a first switching element 21, a power selection circuit 22, a first control module 23, a lockout module 24, a charging module 230, a second switching element 31, a voltage conversion circuit 32, a second control module 33, a bias 33-1, a switching controller 33-2, a switch 35, a battery 240, a detection module 250, a power module 260 and a processor 270.

According to certain embodiments, the electronic device 208 of FIG. 10 may be similar to the electronic device 207 of FIG. 9. However, the electronic device 208 of FIG. 10 may not include a delay element (for example, the delay element 34 of FIG. 9) and the processor 270 may control turning on/off of the switch 35. For example, when a signal informing that a power supply function is enabled is received from the charging module 230, the processor 270 may turn on the switch 35. In another example, when a designated second time which is counted through an internal timer is elapsed, the processor 270 may turn on the switch 35. According to certain embodiments, the processor 270 may turn off the switch 35 when a debounce time is elapsed (for example, when an output power is stabilized).

The electronic device 208 of FIG. 10 is similar to the electronic device 207 of FIG. 9, the electronic device 205 of FIG. 7, or the electronic device 202 of FIG. 4 except for the above-described difference, and a detailed description of other components illustrated in FIG. 10 is omitted.

Figure 11:
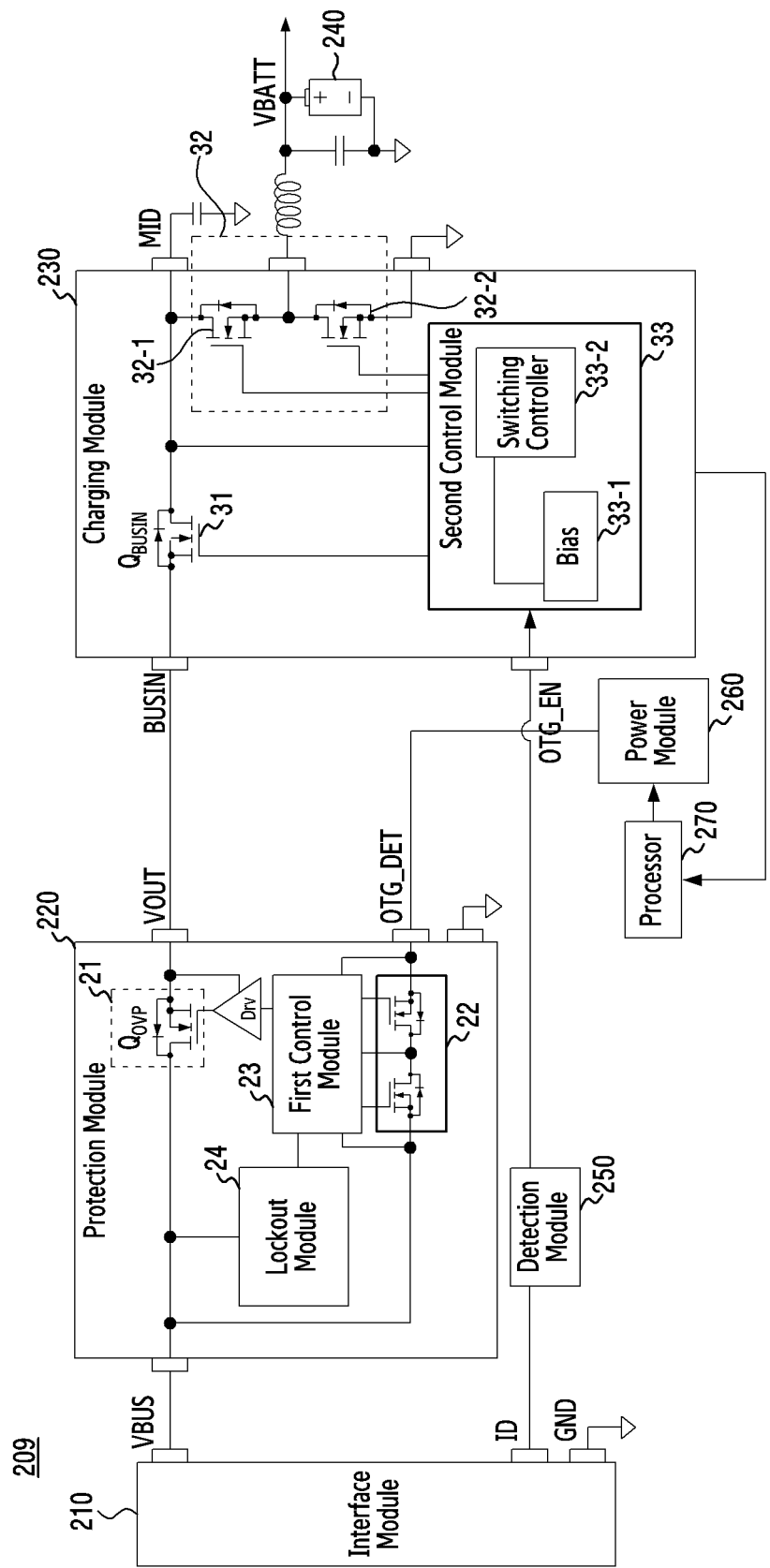
FIG. 11 is a block diagram of an electronic device which provides power to an external device according to a further additional embodiment of the disclosure.

FIG. 11 is a block diagram of an electronic device which provides power to an external device according to a further additional embodiment of the disclosure.

Referring to FIG. 11, the electronic device 209 (for example, the electronic device 101 of FIG. 1, the electronic device 200 of FIG. 2) according to a further additional embodiment of the disclosure may include an interface module 210, a protection module 220, a first switching element 21, a power selection circuit 22, a first control module 23, a lockout module 24, a charging module 230, a second switching element 31, a voltage conversion circuit 32, a second control module 33, a bias 33-1, a switching controller 33-2, a battery 240, a detection module 250, a power module 260, and a processor 270.

According to certain embodiments, the electronic device 209 of FIG. 11 may be similar to the electronic device 207 of FIG. 9. However, the electronic device 209 of FIG. 11 may not include a delay element (for example, the delay element 34 of FIG. 9), and the power module 260 may be electrically connected with the power selection circuit 22 of the protection module 220.

According to certain embodiments, the processor 270 may control turning on/off of the power module 260. For example, when a signal informing that a power supply function is enabled is received from the charging module 230, the processor 270 may turn on the power module 260 to supply a first power to the protection module 220. According to a certain embodiment, the processor 270 may turn on the power module 260 after a designated second time is elapsed. For example, the processor 270 may count the second time through an internal timer, and may turn on the power module 260 when counting is completed.

According to certain embodiments, when a debounce time is elapsed (for example, when an output power is stabilized), the processor 270 may turn off the power module 260 and may stop supplying the first power.

The electronic device 209 of FIG. 11 is similar to the electronic device 207 of FIG. 9, the electronic device 206 of FIG. 8, or the electronic device 203 of FIG. 5 except for the above-described difference, and a detailed description of other components illustrated in FIG. 11 is omitted.

According to certain embodiments of the disclosure, an electronic device (for example, the electronic device 101 of FIG. 1, the electronic device 200 of FIG. 2, the electronic device 201 of FIG. 3A, the electronic device 202 of FIG. 4, the electronic device 203 of FIG. 5) may include: a battery (for example, the battery 189, the battery 240 of FIGS. 2, 3A, 4, and 5); an interface module (for example, the connection terminal 178 of FIG. 1, the interface module 210 of FIGS. 2, 3A, 4, and 5); a detection module (for example, the detection module 250 of FIGS. 2, 3A, 4, and 5) electrically connected with the interface module, the detection module configured to detect than an external electronic device for receiving power is connected to the interface module; a protection module (for example, the protection module 220 of FIGS. 2, 3A, 4, and 5) electrically connected with the interface module and including a first switching element (for example, the switching element 221 of FIG. 2, the first switching element 21 of FIGS. 3A, 4, and 5); and a charging module (for example, the charging module 230 of FIGS. 2, 3A, 4 and 5) electrically connected with the protection module, the detection module, and the battery, and including a voltage conversion circuit (for example, the voltage conversion circuit 32 of FIGS. 3A, 4, and 5) and a second switching element (for example, the second switching element 31 of FIGS. 3A, 4, and 5), the charging module configured to provide a first power to the protection module when the detection module detects connection of the external electronic device. The first switching element is configured to turn on after receiving the first power, and the charging module may raise a power from the battery to a designated value through the voltage conversion circuit, thereby resulting in a second power, and, when a designated first time is elapsed after the power from the battery is raised to the designated value, the charging module may turn on the second switching element, thereby providing the second power to the protection module.

According to certain embodiments, the charging module may gradually increase the second power.

According to certain embodiments, the protection module may further include: a power selection module (for example, the power selection module 22 of FIGS. 3A, 4, and 5) configured to select one of the first power and an output power of the protection module; and a control module (for example, the first control module 23 of FIGS. 3A, 4, and 5) configured to be driven by the power selected by the power selection module and to turn on the first switching element.

According to certain embodiments, the charging module may further include a bias power (for example, the bias 33-1 of FIG. 5), and the charging module may supply the bias power to the protection module as the first power after a designated second time is elapsed.

According to certain embodiments, the charging module may further include: a bias power (for example, the bias 33-1 of FIG. 4); a switch (for example, the switch 35 of FIG. 4) positioned between the bias power and the protection module; and a control module (for example, the second control module 33 of FIG. 4) configured to turn on the switch after a designated second time is elapsed.

According to certain embodiments, the charging module may stop supplying the first power when an output power output to the interface module from the protection module stabilizes.

According to certain embodiments, the charging module may further include: a bias power (for example, the bias 33-1 of FIG. 3A); a switch (for example, the switch 35 of FIG. 3A) positioned between the bias voltage and the protection module; and a delay element (for example, the delay element 34 of FIG. 3A) positioned between the detection module and the switch to delay a designated second time and to transmit a signal to the switch.

According to certain embodiments of the disclosure, an electronic device (for example, the electronic device 101 of FIG. 1, the electronic device 200 of FIG. 2, the electronic device 204 of FIG. 6, the electronic device 205 of FIG. 7, the electronic device 206 of FIG. 8) may include: a battery (for example, the battery 189 of FIG. 1, the battery 240 of FIGS. 2, 6, 7, and 8); an interface module (for example, the connection terminal 178 of FIG. 1, the interface module 210 of FIGS. 2, 6, 7, and 8); a power module (for example, the power module 260 of FIGS. 6, 7, and 8); a detection module (for example, the detection module 250 of FIGS. 2, 6, 7, and 8) electrically connected with the interface module, the detection module configured to detect than an external electronic device is connected to the interface for receiving power; a protection module (for example, the protection module 220 of FIGS. 2, 6, 7, and 8) electrically connected with the interface module and including a first switching element (for example, the switching element 221 of FIG. 2, the first switching element 21 of FIGS. 6, 7, and 8), wherein the protection module is configured to turn on the first switching element in response to receiving a first power from the power module; a charging module (for example, the charging module 230 of FIGS. 2, 6, 7, and 8) electrically connected with the protection module, the detection module, the power module, and the battery, and including a voltage conversion circuit (for example, the voltage conversion circuit 32 of FIGS. 6, 7, and 8) and a second switching element (for example, the second switching element 31 of FIGS. 6, 7, and 8), the charging module configured to enable the power module in response to the detection module detecting the external electronic device; The charging module may use the voltage conversion circuit to raise a power from the battery to a designated value, thereby resulting in a second power, and, when a designated first time is elapsed after the power of the battery is raised to the designated value, the charging module may turn on the second switching element, thereby supplying the second power to the protection module.

According to certain embodiments, the charging module may gradually increase the second power.

According to certain embodiments, the protection module may further include: a power selection module (for example, the power selection module 22 of FIGS. 6, 7, and 8) configured to select one of the first power or an output power of the protection module; and a control module (for example, the first control module 23 of FIGS. 6, 7, and 8) driven by the power selected by the power selection module to turn on the first switching element.

According to certain embodiments, the charging module may enable the power module after a designated second time is elapsed and may supply the first power to the protection module after the designated second time is elapsed.

According to certain embodiments, the electronic device may further include a switch (for example, the switch 35 of FIG. 7) positioned between the power module and the protection module. The charging module may further include a control module (for example, the second control module 33 of FIG. 7) configured to turn on the switch after a designated second time is elapsed.

According to certain embodiments, the charging module may disable the power module when an output power outputted to the interface module from the protection module is stabilized.

According to certain embodiments, the electronic device may further include: a switch (for example, the switch 35 of FIG. 6) positioned between the power module and the protection module; and a delay element (for example, the delay element 34 of FIG. 6) positioned between the detection module and the switch to delay a designated second time and to transmit a signal.

According to certain embodiments of the disclosure, an electronic device (for example, the electronic device 101 of FIG. 1, the electronic device 200 of FIG. 2, the electronic device 207 of FIG. 9, the electronic device 208 of FIG. 10, the electronic device 209 of FIG. 11) may include: a battery (for example, the battery 189 of FIG. 1, the battery 240 of FIGS. 2, 9, 10, and 11); an interface module (for example, the connection terminal 178 of FIG. 1, the interface module 210 of FIGS. 2, 9, 10, and 11); a power module (for example, the power module 260 of FIGS. 9, 10, 11), a detection module (for example, the detection module 250 of FIGS. 2, 9, 10, and 11) electrically connected with the interface module, the detection module configured to detect that an external electronic device is connected to the interface module for receiving a power supply; a protection module (for example, the protection module 220 of FIGS. 2, 9, 10, and 11) electrically connected with the interface module and including a first switching element (for example, the switching element 221 of FIG. 2, the first switching element 21 of FIGS. 9, 10, and 11); a processor (for example, the processor 120 of FIG. 1, the processor 270 of FIGS. 9, 10, and 11); and a charging module (for example, the charging module 230 of FIGS. 2, 9, 10, and 11) electrically connected with the protection module, the detection module, and the battery, the power module, the processor, and including a voltage conversion circuit (for example, the voltage conversion circuit 32 of FIGS. 9, 10, and 11) and a second switching element (for example, the second switching element 31 of FIGS. 9, 10 and 11). The charging module may notify the processor of connection of the external electronic device in response to the detecting. In response to the notification, the processor may enable the power module and may supply a first power to the protection module. The protection module may turn on the first switching element in response to the first power being supplied from the power module. The charging module may use the voltage conversion circuit to raise power from the battery to a designated value, thereby resulting in a second power, and, when a designated first time is elapsed after the power of the battery is raised to the designated value, the charging module may turn on the second switching element, thereby supplying the second power to the protection module.

According to certain embodiments, the charging module may gradually increase the second power and may supply the second power to the protection module.

According to certain embodiments, the protection module may further include: a power selection module (for example, the power selection module 22 of FIGS. 9, 10, and 11) configured to select one of the first power or an output power of the protection module; and a control module (for example, the first control module 23 of FIGS. 9, 10, and 11) driven by the power selected by the power selection module to turn on the first switching element.

According to certain embodiments, the charging module may transmit the notification to the processor after a designated second time is elapsed, or the processor receiving the notification may enable the power module after the second time is elapsed, and may supply the first power to the protection module after the designated second time is elapsed.

According to certain embodiments, the electronic device may further include a switch (for example, the switch 35 of FIG. 10) positioned between the power module and the protection module. The processor may turn on the switch after the designated second time is elapsed. The charging module may transmit, to the processor, a signal disabling the power module when an output power outputted to the interface module from the protection module is stabilized.

According to certain embodiments, the interface module comprises a Universal Serial Bus (USB) Interface.

According to certain embodiments, the electronic device may further include: a switch (for example, the switch 35 of FIG. 9) positioned between the power module and the protection module; and a delay element (for example, the delay element 34 of FIG. 9) positioned between the detection module and the switch to delay a designated second time and to transmit a signal.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Although certain embodiments have been described with a degree of particularity, it shall be understood that the foregoing embodiments are provided by way of example, and are not intended to be limiting. Moreover, it shall understood that modifications, revisions, additions, and substitutions may be made to the embodiments presented herein, and without departing from the spirit and scope of this document.

What is claimed is:

1. An electronic device comprising:
    a battery;
    an interface module;
    a detection module electrically connected with the interface module, the detection module configured to detect that an external electronic device for receiving power is connected to the interface module;
    a protection module electrically connected with the interface module and comprising a first switching element; and
    a charging module electrically connected with the protection module, the detection module, and the battery, and comprising a voltage conversion circuit and a second switching element, the charging module configured to provide a first power to the protection module when the detection module detects connection of the external electronic device,
    wherein the first switching element is configured to turn on after receiving the first power, and
    wherein the charging module is configured to raise a power from the battery to a designated value through the voltage conversion circuit, thereby resulting in a second power, and, when a designated first time is elapsed after the power from the battery is raised to the designated value, turn on the second switching element, thereby providing the second power to the protection module.

2. The electronic device of claim 1, wherein the charging module is configured to gradually increase the second power and to supply the increased second power to the protection module.

3. The electronic device of claim 1, wherein the protection module further comprises:
    a power selection module configured to select one of the first power and an output power of the protection module; and
    a control module configured to be driven by the power selected by the power selection module and to turn on the first switching element.

4. The electronic device of claim 1, wherein the charging module further comprises a bias power, and
    wherein the charging module is configured to supply the bias power to the protection module as the first power after a designated second time is elapsed.

5. The electronic device of claim 1, wherein the charging module further comprises:
    a bias power;
    a switch positioned between the bias power and the protection module; and
    a control module configured to turn on the switch after a designated second time is elapsed.

6. The electronic device of claim 1, wherein the charging module is configured to stop supplying the first power when an output power output to the interface module from the protection module stabilizes.

7. The electronic device of claim 1, wherein the charging module further comprises:
    a bias power;
    a switch positioned between the bias power and the protection module; and
    a delay element positioned between the detection module and the switch to delay a designated second time and to transmit a signal to the switch.

8. An electronic device comprising:
    a battery;
    an interface module;
    a power module;
    a detection module electrically connected with the interface module, the detection module configured to detect that an external electronic device requiring a power supply is connected to the interface module;
    a protection module electrically connected with the interface module and comprising a first switching element, wherein the protection module configured to turn on the first switching element in response to receiving a first power from the power module;
    a charging module electrically connected with the protection module, the detection module, the power module, and the battery, and comprising a voltage conversion circuit and a second switching element, the charging module configured to enable the power module in response to the detection module detecting the external electronic device; and
    wherein the charging module is configured to use the voltage conversion circuit to raise power from the battery to a designated value, thereby resulting in a second power, and, when a designated first time is elapsed after the power of the battery is raised to the designated value, turn on the second switching element, thereby supplying the second power to the protection module.

9. The electronic device of claim 8, wherein the charging module is configured to gradually increase the second power and to supply the increased second power to the protection module.

10. The electronic device of claim 8, wherein the protection module further comprises:

a power selection module configured to select one of the first power or an output power of the protection module; and a control module configured to be driven by the power selected by the power selection module and configured to turn on the first switching element.

11. The electronic device of claim 8, wherein the charging module is configured to enable the power module after a designated second time is elapsed and to supply the first power to the protection module after the designated second time is elapsed.

12. The electronic device of claim 8, further comprising a switch positioned between the power module and the protection module, wherein the charging module further comprises a control module configured to turn on the switch after a designated second time is elapsed.

13. The electronic device of claim 8, wherein the charging module is configured to disable the power module when an output power outputted to the interface module from the protection module is stabilized.

14. The electronic device of claim 8, further comprising:

a switch positioned between the power module and the protection module; and a delay element positioned between the detection module and the switch to delay a designated second time and to transmit a signal.

15. An electronic device comprising:

a battery;

an interface module;

a power module;

a detection module electrically connected with the interface module the detection module configured to detect that an external electronic device is connected to the interface module for receiving a power supply;

a protection module electrically connected with the interface module and comprising a first switching element;

a processor; and a charging module electrically connected with the protection module, the detection module, the power module, the processor, and the battery, and comprising a voltage conversion circuit and a second switching element;

wherein the charging module is configured to notify the processor of connection of the external electronic device in response to the detecting, wherein, in response to the notification, the processor is configured to enable the power module and to supply a first power to the protection module, wherein the protection module is configured to turn on the first switching element in response to the first power being supplied from the power module, and wherein the charging module is configured to use the voltage conversion circuit to raise power from the battery to a designated value, thereby resulting in a second power, and, when a designated first time is elapsed after the power of the battery is raised to the designated value, turn on the second switching element, thereby supplying the second power to the protection module.

16. The electronic device of claim 15, wherein the charging module is configured to gradually increase the second power and to supply the increased second power to the protection module.

17. The electronic device of claim 15, wherein the protection module further comprises:

a power selection module configured to select one of the first power and an output power of the protection module; and a control module configured to be driven by the power selected by the power selection module and to turn on the first switching element.

18. The electronic device of claim 15, wherein the charging module further comprises a bias power, and wherein the charging module is configured to supply the bias power to the protection module as the first power after a designated second time is elapsed.

19. The electronic device of claim 15, wherein the charging module is configured to stop supplying the first power when an output power output to the interface module from the protection module stabilizes.

20. The electronic device of claim 15, wherein the interface module comprises a Universal Serial Bus (USB) interface.

* * * * *